US008753591B2

(12) United States Patent
Rockandel et al.

(10) Patent No.: US 8,753,591 B2
(45) Date of Patent: Jun. 17, 2014

(54) PROCESS FOR THE CONVERSION OF MOLYBDENITE TO MOLYDENUM OXIDE (71) Applicant: Kennecott Utah Copper LLC, South Jordan, UT (US)

(72) Inventors: Mike Rockandel, Oro Valley, AZ (US); Claus Stoiber, West Jordan, UT (US); Robert E. Crossman, Herriman, UT (US)

(73) Assignee: Kennecott Utah Copper LLC, South Jordan, UT (US)

( * ) Notice: Subject to any disclaimer, the term of this patent is extended or adjusted under 35 U.S.C. 154(b) by 0 days.

(21) Appl. No.: 13/780,312

(22) Filed: Feb. 28, 2013

(65) Prior Publication Data
US 2013/0251609 A1   Sep. 26, 2013

Related U.S. Application Data (60) Provisional application No. 61/614,616, filed on Mar. 23, 2012.

(51) Int. Cl.
*C22B 3/00*   (2006.01)

(52) U.S. Cl.
USPC .................. 423/49; 423/54; 423/55; 423/56; 423/87; 423/199; 423/299; 423/356; 423/510; 423/606

(58) Field of Classification Search
None
See application file for complete search history.

(56) References Cited

U.S. PATENT DOCUMENTS

| | | |
|---|---|---|
| 2,202,525 A | 5/1940 | Hixson et al. |
| 3,453,068 A | 7/1969 | Tave |
| 3,455,677 A | 7/1969 | Litz |
| 3,458,277 A | 7/1969 | Platzke et al. |
| 3,576,595 A | 4/1971 | Chiola et al. |
| 3,578,392 A | 5/1971 | Ritsko |
| 3,598,519 A | 8/1971 | Chiola et al. |
| 3,656,888 A | 4/1972 | Barry et al. |
| 3,658,464 A | 4/1972 | Barry et al. |
| 3,681,016 A | 8/1972 | Litz |
| 3,739,057 A | 6/1973 | Daugherty et al. |
| 3,770,414 A | 11/1973 | Lake et al. |
| 3,829,550 A | 8/1974 | Ronzio et al. |
| 3,862,292 A | 1/1975 | Bauer et al. |
| 3,911,076 A | 10/1975 | Probert et al. |
| 3,932,579 A | 1/1976 | Morgan |
| 3,932,580 A | 1/1976 | Vertes et al. |
| 3,933,971 A | 1/1976 | Baucom |
| 3,941,867 A | 3/1976 | Wilkomirsky et al. |
| 3,954,946 A | 5/1976 | Graf et al. |
| 3,963,823 A | 6/1976 | Kulkarni |
| 3,988,418 A | 10/1976 | Kerfoot et al. |
| 4,000,244 A | 12/1976 | Mollerstedt et al. |
| 4,006,212 A | 2/1977 | Alper et al. |
| 4,026,988 A | 5/1977 | Wells et al. |
| 4,046,852 A | 9/1977 | Vertes et al. |
| 4,049,771 A | 9/1977 | Quatrini et al. |
| 4,079,116 A | 3/1978 | Ronzio et al. |
| 4,083,921 A | 4/1978 | Wesely |
| 4,165,362 A | 8/1979 | Reynolds |
| 4,207,296 A | 6/1980 | Nauta et al. |
| 4,211,753 A | 7/1980 | Pemsler et al. |
| 4,273,745 A | 6/1981 | Laferty et al. |
| 4,278,641 A | 7/1981 | Petrov et al. |
| 4,346,061 A | 8/1982 | Goddard |
| 4,376,647 A | 3/1983 | Sohn |
| 4,379,127 A | 4/1983 | Bauer et al. |
| 4,420,331 A | 12/1983 | van't Sant et al. |
| 4,432,947 A | 2/1984 | Maurel |
| 4,434,140 A | 2/1984 | Hubred et al. |
| 4,444,733 A | 4/1984 | Laferty et al. |
| 4,478,698 A | 10/1984 | Wilkomirsky et al. |
| 4,500,496 A | 2/1985 | Austin et al. |
| 4,512,958 A | 4/1985 | Bauer et al. |
| 4,525,331 A | 6/1985 | Cheresnowsky et al. |
| 4,551,312 A | 11/1985 | Yuill |
| 4,555,386 A | 11/1985 | Cheresnowsky |
| 4,596,701 A | 6/1986 | Cheresnowsky et al. |
| 4,599,224 A | 7/1986 | Vanderpool et al. |
| 4,601,890 A | 7/1986 | Cheresnowsky |
| 4,604,266 A | 8/1986 | Cheresnowsky et al. |
| 4,702,895 A | 10/1987 | Cheresnowsky et al. |
| 4,814,148 A | 3/1989 | Cheresnowsky et al. |

(Continued)

FOREIGN PATENT DOCUMENTS

| | | | |
|---|---|---|---|
| DE | 3710725 A1 | 10/1988 | |
| DE | 19838312 A1 | 3/2000 | |

(Continued)

*Primary Examiner* — Steven Bos (74) *Attorney, Agent, or Firm* — Whyte Hirschboeck Dudek S.C.

(57) ABSTRACT

Molybdic oxide is recovered from molybdenite by a multistep process in which (A) the molybdenite is converted to soluble and insoluble molybdic oxide by pressure oxidation, (B) the insoluble molybdic oxide is converted to soluble molybdic oxide by alkaline digestion and then combined with the soluble molybdic oxide, and (C) the molybdenum values of the combined streams are extracted into an organic phase using a nonprimary amine. The extracted molybdenum values are recovered from the organic phase using aqueous ammonia to form ammonium dimolybdate (ADM) which is recovered as refined crystals from a two-step calcination process. Hallmarks of the process include one or more of economic ammonia recovery and recycle, use of ferrous sulfate to remove arsenic and/or phosphorus from the Mo-loaded aqueous ammonia strip liquor, two-stage calcination of ADM crystals, recovery of rhenium from a filtrate of the residual molybdenum precipitation stage, selenium removal from the liquid fraction from which rhenium is recovered, and caustic boil of the mother liquor from which the selenium is precipitated.

20 Claims, 3 Drawing Sheets

(56) References Cited

U.S. PATENT DOCUMENTS

| | | | |
|---|---|---|---|
| 4,861,565 | A | 8/1989 | Sefton et al. |
| 4,885,144 | A | 12/1989 | Cheresnowsky |
| 4,888,207 | A | 12/1989 | Flynn, Jr. et al. |
| 4,933,152 | A | 6/1990 | Scheftic et al. |
| 4,961,910 | A | 10/1990 | Vanderpool et al. |
| 5,002,740 | A | 3/1991 | Cheresnowsky et al. |
| 5,039,428 | A | 8/1991 | Wentzler et al. |
| 5,185,133 | A | 2/1993 | Scheftic et al. |
| 5,804,151 | A * | 9/1998 | Sweetser et al. ............ 423/58 |
| 5,820,844 | A | 10/1998 | Khan et al. |
| 5,891,407 | A | 4/1999 | Gutknecht et al. |
| 5,894,016 | A | 4/1999 | Fister |
| 5,985,236 | A | 11/1999 | Khan et al. |
| 6,149,883 | A * | 11/2000 | Ketcham et al. ............ 423/54 |
| 6,183,706 | B1 | 2/2001 | King |
| 6,190,625 | B1 | 2/2001 | Jha et al. |
| 6,680,034 | B2 | 1/2004 | Marsden et al. |
| 6,730,279 | B2 | 5/2004 | Balliett et al. |
| 6,818,191 | B2 | 11/2004 | Litz et al. |
| 7,169,371 | B2 | 1/2007 | Jones |
| 7,341,700 | B2 | 3/2008 | Marsden et al. |
| 7,416,712 | B2 | 8/2008 | Beckmann |
| 7,462,272 | B2 | 12/2008 | Marsden et al. |
| 7,470,414 | B2 | 12/2008 | Ishikawa et al. |
| 7,476,308 | B2 | 1/2009 | Marsden et al. |
| 7,485,216 | B2 | 2/2009 | Marsden et al. |
| 7,722,756 | B2 | 5/2010 | Marsden et al. |
| 7,736,487 | B2 | 6/2010 | Marsden et al. |
| 7,736,488 | B2 | 6/2010 | Marsden et al. |
| 7,824,633 | B2 | 11/2010 | Amelunxen et al. |
| 8,153,009 | B2 | 4/2012 | Gilar et al. |
| 2004/0120883 | A1 | 6/2004 | Nesper et al. |
| 2005/0019247 | A1 | 1/2005 | Balliett et al. |
| 2008/0124269 | A1 | 5/2008 | Daudey et al. |
| 2011/0014097 | A1 | 1/2011 | Amelunxen et al. |
| 2012/0058029 | A1 | 3/2012 | Ferron et al. |
| 2012/0189513 | A1 | 7/2012 | Rossiter |
| 2012/0189514 | A1 | 7/2012 | Rossiter |

FOREIGN PATENT DOCUMENTS

| | | |
|---|---|---|
| DE | 102007030394 A1 | 1/2009 |
| FR | 2512005 A1 | 3/1983 |
| FR | 2673617 A1 | 9/1992 |

* cited by examiner

PROCESS FOR THE CONVERSION OF MOLYBDENITE TO MOLYDENUM OXIDE

BACKGROUND OF THE INVENTION

1. Field of the Invention

This invention relates to the production of molybdenum oxide ($MoO_x$). In one aspect the invention relates to a multi-step, hydrometallurgical, pressure oxidation process for the conversion of molybdenite ($MoS_2$) to $MoO_x$, preferably molybdenum trioxide ($MoO_3$), while in another aspect, the invention relates to such a process that includes steps of solvent extraction, aqueous ammonia recycle, rhenium recovery and selenium removal.

2. Description of the Related Art

Molybdenum is a grey metal or black powder with many uses. One use is as an alloying agent in the production of stainless and low alloy steels to enhance toughness, high-temperature strength and corrosion resistance. Another use is as a component in oil refining catalysts used in the removal of sulfur from fuel.

Molybdenum does not occur free in nature but typically as a sulfide. Molybdenum disulfide ($MoS_2$), also known as molybdenite, is commonly found in association with copper ores, and it is separated and concentrated from other minerals in the copper ore by froth flotation.

Typically, at first, a bulk copper/molybdenum concentrate is produced. The molybdenite concentrate is then produced by suppression of other minerals like chalcopyrite and pyrite. Molybdenum disulfide is then up-graded in a number of sequential cleaning steps. The molybdenite concentrate is filtered and dried for further processing.

Molybdenum is typically sold as an oxide which requires converting the molybdenite to a molybdenum oxide. The most common process for converting molybdenite to molybdenum oxide is roasting in which the concentrate is heated while in contact with an excess air to form molybdenum trioxide and sulfur dioxide as a gaseous by-product.

Another process for converting molybdenite to molybdenum oxide is the hydrometallurgical process of pressure oxidation. U.S. Pat. No. 6,149,883 teaches the production of molybdenum trioxide from molybdenite by a pressure oxidation process comprising the steps of forming an aqueous slurry of molybdenite, pressure oxidizing the slurry to form soluble and insoluble molybdenum species, converting the insoluble molybdenum species to soluble molybdenum species by alkaline digestion, separating the soluble molybdenum species from insoluble residue contaminants (if present), removing the molybdenum species from the aqueous media through solvent extraction, recovering the molybdenum values from the organic solvent as soluble ammonium dimolybdate by stripping with aqueous ammonia, recovering ammonium dimolybdate crystals by evaporative crystallization, and recovery of molybdenum trioxide ($MoO_3$) by thermal decomposition (calcination). Low grade molybdenite concentrates, including concentrator slimes containing talc and sericite, can be used as a feed. The process produces both technical and chemical grade molybdenum trioxide.

The process of the '883 patent, while effective, has room for operational and capital cost improvement. For example, improvements in the recovery of ammonia, the recovery of rhenium, and the reduction in the discharge of selenium all are of interest to the producers of molybdenum oxide. In addition, any reduction in energy usage and/or environmental footprint is a welcomed addition to the overall efficiency of the process.

SUMMARY OF THE INVENTION

In one embodiment the invention is a process for converting molybdenite to molybdenum oxide, the process comprising the steps of:
A. Contacting under pressure oxygen and an aqueous suspension of molybdenite to form an acidic solution comprising dissolved molybdenum and a solid fraction comprising insoluble molybdic oxide;
B. Separating the acidic solution comprising dissolved molybdenum from the solid fraction comprising the insoluble molybdic oxide;
C. Converting at least a portion of the insoluble molybdic oxide of the solid fraction of step A to acid-soluble molybdic oxide;
D. Combining the acidic solution comprising dissolved molybdenum of step A with the acid-soluble molybdic oxide of step C to dissolve the acid-soluble molybdic oxide;
E. Extracting the dissolved molybdenum of step D into an organic solvent comprising a nonprimary amine to produce a molybdenum-rich organic phase and a molybdenum-depleted aqueous raffinate;
F. Contacting the molybdenum-rich organic phase of step E with aqueous ammonium hydroxide to recover an aqueous strip liquor comprising molybdenum as solubilized ammonium dimolybdate (ADM);
G. Crystallizing at least a portion of the solubilized ADM;
H. Calcining the crystallized ADM in a first calcination zone operated at 300-450° C. and with a countercurrent sweep of steam to produce a first calcined product and concentrated ammonia; and
I. Calcining the first calcined product of step H in a second calcination zone operated at a temperature 450-600° C. under and in contact with an oxygen-containing atmosphere to produce a second calcined product comprising molybdenum oxide.

The hallmark of this embodiment is the two-stage calcination of ADM crystals. The steam of the countercurrent sweep is fully condensable producing little, if any, effluent gas. The concentrated ammonia of step H is typically in the form of a vent gas suitable for recovery. The calcination of the ADM crystals is virtually complete and the recovery of ammonia from the decomposition of the crystals is near quantitative.

In one embodiment of the invention the aqueous suspension of the molybdenite concentrate further comprises arsenic, copper, iron and phosphorus, and forms an acidic solution comprising dissolved molybdenum, arsenic, copper, iron and phosphorus and a solid fraction comprising insoluble molybdic oxide. In this and other embodiments, the aqueous strip liquor produced in step F is contacted in a step F' under aeration conditions with ferrous sulfate at a pH of 7 or greater to produce precipitated arsenic and phosphorus and an arsenic- and phosphorus-depleted strip liquor containing solubilized ADM.

The hallmark of this embodiment is the use of ferrous sulfate to precipitate arsenic and phosphorus in step G in contrast to conventional magnesium sulfate or ferric sulfate. Ferrous sulfate produces a lower volume and more filterable precipitate thus allowing for the use of smaller filtering equipment.

In one embodiment of the invention the aqueous suspension of the molybdenite concentrate further comprises rhenium and forms an acidic solution comprising dissolved molybdenum and rhenium and a solid fraction comprising insoluble molybdic oxide. In this and other embodiments, at least a portion of the solubilized ADM is crystallized in two stages, the first stage producing crude ADM crystals and a mother liquor purge stream containing dissolved molybdenum and rhenium values, the crude ADM crystals dissolved in water and filtered to form a feed for the second stage, and the second stage producing refined ADM crystals, and the mother liquor purge stream from the first stage contacted with an acid to produce precipitated molybdenum and a molybdenum-depleted mother liquor containing rhenium. The molybdenum-depleted mother liquor is then contacted with a weak base ion exchange resin to recover rhenium values.

The hallmarks of this embodiment are (i) the placement of the rhenium recovery step (a step G') after the precipitation of molybdenum from the mother liquor purge stream from the first stage crystallizer, and (ii) the use of a micro-porous, weak-acid ion exchange resin to extract the rhenium values from molybdenum-depleted mother liquor of step G.

In one embodiment of the invention the aqueous suspension of the molybdenite concentrate further comprises rhenium and selenium and forms an acidic solution comprising dissolved molybdenum, rhenium and selenium and a solid fraction comprising insoluble molybdic oxide. In this and other embodiments, at least a portion of the solubilized ADM is crystallized in two stages, the first stage producing crude ADM crystals and a mother liquor purge stream containing dissolved molybdenum, rhenium and selenium values, the crude ADM crystals dissolved in water and filtered to form a feed for the second stage, and the second stage producing refined ADM crystals, and the mother liquor purge stream from the first stage contacted with an acid to produce precipitated molybdenum and a molybdenum-depleted mother liquor containing rhenium and selenium. As with the previously described embodiment, the molybdenum-depleted mother liquor is contacted with a weak base ion exchange resin to recover rhenium values and to produce molybdenum-depleted and rhenium-depleted mother liquor containing selenium. The molybdenum- and rhenium-depleted mother liquor containing selenium is then contacted with iron powder to produce precipitated selenium.

The hallmark of this embodiment is the removal in a step G" of selenium from the molybdenum-depleted and rhenium-depleted mother liquor of step G'. In one embodiment selenium removal is effected in two stages.

The process of this invention in its various embodiments can be operated to recover technical or chemical grade molybdenum trioxide. Solid products of the process include leach residue, purification precipitate (e.g., iron hydroxide), copper precipitate and effluent neutralization precipitate (e.g., gypsum). Purification and effluent neutralization precipitates are sent to tailings while the others are sent to the smelter for metals recovery.

Copper sulfide values present in the molybdenite concentrate are also oxidized and dissolved in step A, and rejected into the raffinate of step E and are recovered by any conventional technique, e.g. solvent extraction or ion-exchange followed by electrowinning, or precipitation as a sulfide, hydroxide, carbonate, etc. Precipitated copper sulfide is a suitable smelter feed and depending upon the operational circumstances of the process and smelter may, and often is, the preferred option. The liquor from the copper recovery steps is neutralized and disposed in an environmentally acceptable manner. Gangue is separated from the molybdenum and copper values, and then typically returned to a smelter for further processing to recover additional metal values.

The process of this invention can successfully recover molybdenum trioxide from a wide range of molybdenite concentrate grades including those which are unsuitable for conventional multi-hearth roasting, i.e. those that contain more than 5 wt % copper and more than 10 wt % of naturally floatable gangue minerals, e.g. talc and sericite. As a consequence, the process of this invention allows a greater recovery of molybdenum values (as measured from ore body to final product, e.g., $MoO_3$) because it allows the use of a lower grade ore than does the use of conventional techniques, particularly roasting, and it produces a molybdenum trioxide of higher purity than that produced by roasting.

The process of this invention can comprise the further steps of rhenium recovery and selenium removal. In one embodiment of the invention, rhenium is recovered from the filtrate of the residual molybdenum removal stage which follows the first crystallization of the ADM. In one embodiment, selenium removal follows recovery of the rhenium.

Hallmarks of the process of this invention include one or more of near quantitative ammonia recovery and recycle, use of ferrous sulfate to remove arsenic and/or phosphorus from the Mo-loaded aqueous ammonia strip liquor, two-stage calcination of ADM crystals, recovery of rhenium from the filtrate of the residual molybdenum precipitation stage, selenium removal from the mother liquor from which rhenium is recovered, and caustic boil of the selenium removal discharge solution to recover ammonia from ammonium sulfate.

In one embodiment the invention is a two-stage process for the calcination of ammonium metal compounds, the process comprising the stages of:
 A. Calcining the ammonium metal in a first calcination zone operated at 300-450° C. and with a countercurrent sweep of steam; and
 B. Calcining the product of A in a second calcination zone operated at a temperature 450-600° C. under and in contact with an oxygen-containing atmosphere to produce a metal oxide and ammonia.

The hallmark of this embodiment is the two-stage calcination of an ammonium metal. This embodiment is applicable to ammonium compounds in which the metal is other than molybdenum, e.g., nickel, uranium, vanadium and tungsten.

BRIEF DESCRIPTION OF THE DRAWINGS

The invention is described generally with reference to the drawings for the purpose of illustrating certain embodiments only, and not for the purpose of limiting the scope of the invention. In the drawings like numerals are used to designate like steps or parts throughout the same.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional or process property, such as, for example, temperature, pressure, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, temperature, pressure, reagent concentrations, etc.

"Molybdenum oxide", "moly oxide" and like terms mean molybdenum oxide that can include any form of $Mo_xO_y$, including, but not limited to, molybdenum dioxide and molybdenum trioxide.

"Molybdic oxide" means molybdenum trioxide; molybdenum in the +6 valence state.

"Molybdenite" and "molybdenum disulfide" mean $MoS_2$.

"Molybdenite concentrate" and like terms mean an ore comprising molybdenite that has had been subjected to one or more processes, e.g., flotation, to increase the amount of molybdenite in the ore relative to the other components of the ore. Other components commonly found in molybdenite concentrates include, but are not limited to, compounds of copper, arsenic, rhenium, selenium, iron and phosphorus.

"Technical grade molybdenum oxide" and like terms mean a molybdenum oxide product containing at least 57, and commonly 64-66, wt % molybdenum.

"Chemical grade molybdenum oxide" and like terms mean a molybdenum oxide product containing at least 66, typically 66.6, wt % molybdenum.

"Mother liquor" and like terms mean the saturated liquor in the crystallizer.

"Molybdenum-depleted", "rhenium-depleted" and like terms mean that the amount of molybdenum, rhenium or other values originally in a mother liquor, liquid purge stream, etc., have been reduced, typically by more than half if not quantitatively but not necessarily completely, by one or more extractive or removal processes, e.g., precipitation, ion exchange, and the like.

Process Steps

Step A: Pressure Oxidation

In step A of the process, molybdenite ($MoS_2$) concentrate containing an economically significant amount of $MoS_2$, e.g. as low as 5%, but typically at least 15% and preferably at least 20%, and typically in the form of finely divided particles of a size usually less than 100 mesh (U.S. Standard), is fed to an autoclave for pressure oxidation. The $MoS_2$ concentrate can include materials which previously were uneconomical be processed because they contained unacceptably large amounts of insoluble gangue minerals, e.g. talc and sericite, or deleterious impurities like copper, iron or arsenic. The starting material concentrates of this invention are the product of typical ore beneficiation processes, and the concentrates produced from the rougher or cleaner flotation cells in a molybdenum recovery circuit are preferred. These concentrates are usually in the form of a slurry or filter cake containing small amounts of hydrocarbon flotation oils. These concentrates do not require pretreatment, but if desired, the concentrates can be subjected to retorting, scrubbing with a strong alkali solution or other upgrade treatment which removes or reduces the amounts of flotation oils and/or contaminants, e.g., lead, in the concentrate.

The concentrates used in this invention may contain other materials such as silica, feldspars, naturally floatable gangue minerals such as talc and sericite, various phosphorus values, chlorides, carbonates and other (non-molybdenum) metals such as copper, iron, arsenic, gold, silver, rhenium, selenium, lead, etc. These other materials are present in varying amounts, particularly the metals, although the process of this invention is particularly well adapted for recovering molybdenum values from concentrates with relatively large amounts of copper values, e.g. in excess of 5 weight percent, and relatively large amounts of naturally floatable gangue minerals, e.g. in excess of 10 weight percent, that create difficulties in traditional roasting processes.

The particle size of the concentrate material, measured in terms of $P_{80}$ (80% by weight of the concentrate can pass through a screen of designated mesh size), can vary, although concentrates of relatively small particle size, e.g. $P_{80}$ at 200 or finer mesh, are preferred. This small particle size facilitates the oxidation step by facilitating dispersion and maximizing surface area. Finer grinding is typically not required for flotation mineral liberation.

Molybdenum disulfide, i.e., molybdenite, concentrate is slurried with water or an aqueous solution of metal salts and/or acid to a solids concentration of 5 or more wt %, typically 10, 20, 30, 40, 50 or more wt %, and is fed to the pressure oxidation autoclave on either a batch or continuous basis by a high pressure slurry pump. In one embodiment, the $MoS_2$ concentrate is slurried with water at a solids concentration of 50 wt % with additional, i.e., cooling, water added in a second, separate stream, the amount of which determined by the desired heat balance in the autoclave.

The autoclave itself can be of any suitable design, but it is typically equipped with agitation means, e.g. one or more propeller stirrers, and baffled into two or more compartments. Commercial size autoclaves are typically cylindrical in shape with a diameter of 12 or more feet and a length of 60 or more feet. While the oxidation reaction proceeds at atmospheric pressure and temperatures below 100° C., the reaction conditions are chosen such that the sulfur bound to the molybdenum is essentially completely oxidized in a reasonably short period of time, e.g. one to five hours. "Essentially completely oxidized", "substantially complete conversion of molybdenite", and like terms means that at least 90, preferably at least 95, more preferably at least 97 and even more preferably 99+, percent of the $MoS_2$ is oxidized to molybdenum oxides, either soluble or insoluble.

Preferred reaction rates occur at temperatures in excess of 100° C., preferably in excess of 150° C., more preferably at or in excess of 200° C., and at a partial pressure of free oxygen in excess of 25 psi (172.4 kPa), preferably in excess of 75 psi (517.1 kPa). The maximum partial pressure of free $O_2$ is a function of the autoclave design, but typically it does not exceed 600 psi (4,136.9 kPa), preferably it does not exceed 200 psi (1,379 kPa). The oxygen can be introduced as pure oxygen, oxygen-enriched air or air, although pure oxygen or oxygen-enriched air is preferred to maximize oxygen utilization and operating pressure. In one embodiment the typical operating temperature is 215° C. (420° F.), and a steam pressure of 305 psia (2102.9 kPa) and an oxygen over-pressure of 90 psia (620.52 kPa) for a total operating pressure of 395 psi (2723.43 kPa).

The oxidation reaction is allowed to proceed to substantial completion, e.g., at least 95, preferably at least 98 and even more preferably at least 99, percent complete, the degree of completion and the exact amount of time dependent upon a host of factors such as temperature, pressure, agitation rates, slurry density, particle size, etc. The product of the oxidation reactions includes acid-soluble molybdic oxide ($MoO_3.H_2O$), acid-insoluble molybdenum trioxide ($MoO_3$), and acid-soluble metal sulfate values, e.g. copper and ferric sulfate produced from the oxidation of chalcopyrite, insoluble minerals such as talc and sericite, etc. Rhenium, which is generally present in molybdenite concentrate as a solid solution contaminate in the molybdenite mineral, is oxidized to yield acid-soluble perrhenic acid ($HReO_4$). Selenium, which is generally present in molybdenite concentrate as metal selenide, is oxidized to yield acid-soluble selenic acid ($H_2SeO_4$).

Step B: Separation of Dissolved Molybdenum from Insoluble Molybdic Oxide

Upon completion of the step A pressure oxidation of molybdenite, the solid fraction of the oxidation product, i.e., the fraction comprising insoluble molybdic oxide, is separated from the liquid fraction of the oxidation product, i.e., the acidic solution comprising dissolved molybdenum, by any suitable technique. In one embodiment the pressure is reduced in a two-stage flash let-down. In the first stage the pressure is reduced to about 50 psi (344.74 kPa) and the temperature reduced to about 140° C. The vapor produced in this first stage flash is scrubbed of entrained solids and then passed to a heat exchanger in which clean steam is produced that can be used to heat down-stream processes, e.g., the crystallizer.

The slurry fraction leaving the first flash tank is passed to a second flash tank in which the temperature is reduced to about 100° C. and the pressure reduced to atmospheric pressure. The vapor captured from this second flash tank is also scrubbed and then vented to the atmosphere.

The slurry remaining after the second-stage flash is combined with the effluent from the flash scrubbers, the combination is then cooled (preferably), thickened (optionally) and then filtered using conventional techniques and equipment. The filtered solids, which contain the insoluble moly oxide, are passed to an alkaline leach vessel (e.g., tank) for the step C conversion of the insoluble moly trioxide to soluble moly trioxide, and the filtrate, which is an acidic solution of dissolved molybdenum, is passed forward for eventual combination with the digestion product from step C.

Step C: Alkaline Leach

The undissolved molybdic oxide in the solid fraction separated from the autoclave reaction slurry is converted to a soluble molybdate, preferably a soluble alkali metal molybdate, e.g., a metal of sodium, potassium, etc. While any alkali metal material that will solubilize the insoluble molybdenum trioxide can be used in this step of the process (e.g., sodium and potassium hydroxide, carbonates and bicarbonates, and ammonium hydroxide), soda ash (also known as sodium carbonate or $Na_2CO_3$) is preferred because of its low cost, wide availability, and ease of use. The alkaline earth metal materials, e.g., calcium and magnesium hydroxides, carbonates, etc., are generally disfavored because they produce insoluble molybdates.

The digestion or solubilization of the molybdenum trioxide with soda ash is conducted at ambient temperature (e.g., typically at 20-30° C.), at or near atmospheric pressure, and at a pH of 6.5 to 8 in two or more digesters operated continuously in series, each equipped with agitation means. The density of the reaction mass is a function of the molybdenum content of the solids generated in the pressure oxidation stage (process step A) and of the alkali metal solution strength (e.g., the greater the soda ash strength, the greater the molybdenum content, and the greater the solids density). The pressure oxidation and alkaline digestion stages are operated such that the concentration of molybdenum in the liquid fraction of the slurry at the liquid-solid separation phase of this step is preferably between 10 and 100 grams per liter (g/l).

Step D: Combining of Step B Filtrate with Step C Digestion Product

In step D of the process, the filtrate from step B is combined with the digestion product from step C (which typically contains 5% or less solids). This combination occurs upon the completion of the conversion of insoluble molybdic oxide to acid-soluble molybdic oxide which typically takes from a few minutes to a few hours. The liquid fraction from the pressure oxidation step typically comprises the dominant portion of the mixture, e.g., 70 weight percent or more of the mixture. The mixture is typically acid in pH (e.g., 30+ grams per liter sulphuric acid) as a result of the acid produced during the pressure oxidation stage. If the mixture is not sufficiently acidic to maintain the molybdenum values soluble during solvent extraction for any reason, then acid, e.g., sulphuric acid, can be added such that the solubility of the molybdenum values is maintained during solvent extraction. The acid balance is determined by the quantity of sulfur oxidized in the pressure oxidation. In one embodiment, acid balance is adjusted by adding acid, e.g., sulfuric acid, to the autoclave to lower the pH. The temperature of the mixture during re-acidification, if re-acidification is necessary or desirable, can vary to convenience, but the temperature of the mixture is usually reduced to less than 40, preferably to less than 30, ° C. prior to contact with the extracting solvent.

Whether or not re-acidified, the mixture of filtrate from step B and digestion product from step C is typically in the form of a low-solids density slurry and as such, it is subjected to a separation process, e.g., filtration, to remove as much of the solids present in the slurry as practical. The precipitate or filter cake retains many of the metal values originally contained in the molybdenite concentrate, e.g., silver, gold, etc., and these filtered solids are then subjected to any of various techniques for the recovery of these values. In one embodiment the filtrate is subjected to a second separation (e.g., polishing filtration) step to remove as much of the remaining solids as practical. These secondary separation techniques may include pressure or multi-media filtration. The filtrate, whether or not subjected to a secondary separation step, is then transferred to equipment for the solvent extraction of the solubilized molybdenum values.

Step E: Solvent Extraction

Any conventional solvent extraction technique can be used in the practice of this invention, and it can be conducted in a single or multi-step manner. The extracting solvent usually comprises an organic solvent in combination with a nonprimary amine (e.g. a secondary or tertiary amine) in which the extractant contacts the dissolved, molybdenum-containing liquid fractions of the pressure oxidation and alkaline leach steps in a countercurrent manner. Typically, the contacting is conducted at 20-30° C. and atmospheric pressure, and the extraction of the molybdenum values is near quantitative. Representative tertiary amines include tri-caprylyl amine (e.g. ALAMINE 336) and tri-auryl amine (e.g. ALAMINE 304). A wide range of other secondary and tertiary amines may also be used provided that their molecular structure includes at least one hydrocarbyl group of sufficient molecular weight to effectively limit their solubility in the aqueous phase (e.g. containing ≥6 carbon atoms).

Quaternary amines may also be used, but molybdenum loaded on quaternary amines in the organic phase is more difficult to recover in the stripping stage, requiring a stronger stripping agent than the preferred ammonium hydroxide, and their use in this stage of the process is therefore not preferred.

The extractant is typically dissolved into an organic solvent. A range of organic solvents derived from petroleum or coal liquids may be used, including those of aliphatic or aromatic nature as well as mixtures of the two. In similar applications of solvent extraction for recovery of molybdenum, others (U.S. Pat. Nos. 4,000,244, 4,444,733 and 3,455,677) teach that the addition of one or more modifiers, such as a high molecular weight alcohol or alkyl phosphate esters, to the organic solvent is required to prevent the formation of stable emulsions (also known as a "third phase") when molybdenum loadings of greater than about 10 g/l Mo in the organic phase are desired. Although this is true when using a solvent of full or partial aliphatic nature, modifiers are not required to prevent the formation of stable emulsions if an exclusively aromatic solvent, such as that marketed under the trademark AROMATIC 150, is employed.

Upon contact with the amine-containing organic solvent, the dissolved molybdenum in the filtrate from step D is transferred to the organic phase. Organic solvent remaining with the moly-stripped aqueous phase (raffinate) is removed by any conventional technique, e.g., skimming or coalescing, and recycled back for use in the solvent extraction stage. The metal values remaining in the raffinate, e.g., copper, are then recovered by any conventional technique such as solvent extraction/electrowinning (SXEW), direct electrowinning, and precipitation as a sulfide through the action of any sulfiding agent, e.g. hydrogen sulfide ($H_2S$), sodium hydrogen sulfide (NaHS), etc. NaHS is a preferred sulfiding agent. If the metal values are recovered by precipitation, then the precipitate is separated from the solution by conventional technique, e.g. thickening and filtering, and the solid fraction is transferred to a smelter for recovery of copper and/or other metal values. The aqueous fraction is then neutralized with any suitable neutralizing agent, e.g. limestone, lime, milk of lime, etc. and air which precipitates gypsum ($CaSO_4 \cdot 2H_2O$) and iron hydroxides which can then be transferred to a tailings pond for disposal.

Step F: Extracting $Mo_xO_y$ with $NH_4OH$

The molybdenum-loaded organic phase from the solvent extraction process is first scrubbed with a weak acid solution, e.g. sulfuric acid, to remove any entrained raffinate (aqueous phase) which contains impurities, e.g., copper and iron values. The scrubbed organic phase is then contacted with a stripping medium to recover the molybdenum values. The stripping medium is typically an aqueous alkaline solution, e.g. ammonium hydroxide, which deprotonates the amine at elevated pH releasing the molybdenum.

Ammonia stripping of the Mo-loaded organic extractant produces a Mo-loaded aqueous strip containing a suspension of precipitated silica, $SiO_2$, which was partially dissolved in the autoclave and is believed to form an anionic complex with molybdenum that is co-extracted in the extraction stage (step E) reporting to the strip solution. Preferably this complex is removed prior to molybdenum recovery and in one embodiment, this stripping stage incorporates a settler with a conical bottom to facilitate the movement of this amorphous silica with the aqueous phase for removal in subsequent processing steps. Conventional settler tanks with flat bottoms do not allow for such movement, and such solids will accumulate in the settler and their removal will result in costly downtime and operational inefficiencies. Another option for this silica removal is to remove it at the time of its formation by in-line filtering of the strip suspension advancing from a strip mixer into the settler, thus preventing the solids from entering the settler. These solids are ultimately either disposed of in an environmentally acceptable manner or recycled for further metal recovery.

The rich strip liquor contains various impurities including arsenic and phosphorus. These can be removed by the addition of a precipitating agent such as magnesium sulfate ($MgSO_4$) or ferric sulfate ($Fe_2(SO_4)_3$). Arsenic precipitates best at a pH of about 5 but at an acid pH such as this, or even at a pH of 6-7, considerable molybdenum values are lost (as compared to an alkaline pH of 8 or higher). Precipitating arsenic in the alkaline pH range, however, captures only about 90% of it leaving the rest to be captured down-stream, e.g., in the crystallizer. Phosphorus is chemically similar to arsenic and as such, tracks it closely through precipitation.

In one embodiment the precipitating agent is ferrous sulfate ($FeSO_4$). Ferric sulfate precipitates quickly as ferric hydroxide in solutions with a pH of 8 or higher, i.e., a pH between 8 and 14. The use of ferrous sulfate, however, typically in conjunction with aeration, at a pH of greater than 8 (the typical pH of molybdenum-loaded aqueous ammonia strip liquor is 8-9) results in a controlled oxidation of iron that precipitates arsenic and phosphorus producing a lower volume and more filterable precipitate than that produced by using ferric sulfate and therefore allowing the use of smaller filtering equipment. This is a two-step embodiment in which the Mo-loaded aqueous stream from the solvent extraction stage is first contacted with ferrous sulfate (step F'), and typically with aeration, at a pH of 7 or greater, preferably at a pH of about 9, and the precipitated arsenic and phosphorus values are separated (typically by filtration) from the stripped solution, and the remaining filtrate (that which retains the dissolved molybdenum values, i.e., ADM, and some arsenic values but little, if any, phosphorus values), is then subjected to crystallization conditions under which crude ADM is crystallized along with the remaining arsenic values). These ADM crystals are then re-dissolved in fresh water at about 20° C. to produce a near saturated, almost pure ammonium dimolybdate solution and an insoluble ammonia-arseno-molybdate precipitate that is removed by filtration and recycled to the purification step. The solution with arsenic removed (see U.S. Pat. No. 4,885,144) is again subjected to crystallization to recover the refined ADM crystals (these essentially free of arsenic and phosphorus values, e.g., less than 10 ppm of each).

In one embodiment, a three tank arrangement is employed to which ferrous sulfate and ammonium molybdate solution (solvent extraction strip liquor) is added to the first tank, and overflow from the first tank is fed to the second tank. Air is added to both tanks. Overflow from the second tank is transferred to the third tank, i.e., the filter feed surge tank). The ferrous sulfate used in this embodiment is at least of technical grade and preferably contains less than 1,000 ppm of any contaminant. The recovery of arsenic and phosphorus in this embodiment, in conjunction with the arsenic recovered in the crude crystallization, is near quantitative, if not quantitative, and the recovered values are typically sent to the smelter for further processing.

Step G: Crystallization of the Solubilized ADM

The molybdenum recovery process of this invention uses a two-stage crystallization procedure. The single stage crystallization procedure produces an impure product, e.g., a product with unacceptable levels of arsenic and sulfate for chemical grade molybdic oxide.

In the first stage of the two-stage crystallization process, the filtrate from the arsenic/phosphate removal stage is sent to a first crystallizer which produces an impure or crude ADM. In this first stage the filtrate is steam heated and, optionally, mixed with one or more of (i) centrate from the subsequent centrifugation step for the recovery of the first stage ADM crystals, (ii) purge from the refined or second stage ADM crystallizer, and (iii) seed crystal. Impurities, such as rhenium and selenium, concentrate during this crystallization process and are removed in a liquid purge stream.

Typically, crystallization is performed by evaporation at an elevated temperature and/or reduced pressure, e.g., 70-105° C. and 4-20 psia (27.58–137.9 kPa). Crystals are recovered from the mother liquor by centrifugation or other liquid-solid separating technique, and the bulk of the molybdenum values are recovered as ammonium dimolybdate (ADM). A portion of the aqueous stream is purged from the first crystallizer (approximately 25% which is a function of the ammonium sulfate concentration) and transferred to a molybdenum precipitation stage. Any type of evaporative crystallizer e.g., multiple-effect, forced circulation or draft-tube baffled crystallizer, can be used as the first stage crystallizer.

The first stage crystals are then re-dissolved in water substantially free of metal, free ammonia and other contaminants, e.g., deionized and de-mineralized water such as that produced by a reverse osmosis unit. In one embodiment, the re-dissolved crystals are then subjected to another filtration step to remove any undissolved particles. The filtrate is transferred to the refined or second crystallizer and the filtered solids recycled to the arsenic/phosphorus removal stage.

The second stage or refined crystallizers used in the practice of this invention include the evaporative crystallizers that can be used in the first stage but the preferred crystallizers are those of the growth-type design such as an Oslo or those of a baffled draft-tube design with optional fines destruction capability. The second stage crystallizer is operated in a manner similar to that of the first stage crystallizer, e.g., 70-105° C. and 4-20 psia (27.58–137.9 kPa). Heating can be accomplished by any commercially available means including, but not limited to, thermo-compression, mechanical vapor recompression and indirect heating. In addition to the filtrate from the filtration of the first stage crystals, feeds to the second stage crystallizer may include seed crystals and/or centrate from the subsequent centrifuge separation of the refined ADM crystals from its mother liquor.

In one embodiment, a portion of the mother liquor is purged from the second stage crystallizer to control impurities and, preferably, recycled to the first stage crystallizer. In one embodiment, the mother liquor or some part of it is directed to a molybdenum precipitation stage prior to further processing. In a less favored embodiment (less favored because of the moly values it holds), the mother liquor or some part of it is simply disposed in an environmentally acceptable manner. The second stage or refined ADM crystals are then subjected to centrifugation or other separation technique to remove remaining mother liquor which is recycled to the second stage crystallizer although a portion of it may be purged. The dewatered crystals are transferred to the next stage for drying and calcining.

To avoid saturating the first and second stage mother liquors with impurities, a portion of each may be treated separately rather than recycled to a crystallizer. In this side stream, residual molybdenum values in the crystallizer mother liquor are recovered by precipitating molybdenum from solution (generally accomplished by acidifying the mother liquor with any suitable acid, e.g. sulfuric acid). The molybdenum precipitates as a solid containing a mixture of hydrous molybdenum trioxide and a range of possible ammonium molybdate species, e.g., $(NH_4)_5HMo_6O_{21}$ $H_2O$, $(NH_4)_6Mo_7O_{24}$ $H_2O$, etc., the compositions of which depends on the precise pH and temperature of precipitation. The residual molybdenum recovery solids are separated from the solution, generally by filtration, and are re-dissolved and recycled to the crystallizer to produce ADM.

Steps H and I: Calcining the ADM Crystals

ADM crystals can be calcined without prior drying, but in a preferred embodiment they are typically first dried to a moisture content of less than about one percent, preferably less than about 0.1 weight percent, allowing ease of handling and recovery of a marketable ADM product. The dried crystals are then calcined in two stages to remove ammonia and recover molybdenum trioxide. ADM crystals are decomposed to molybdic oxide, ammonia and water vapor during calcination.

Any conventional calciner can be used in either calcination step and, indeed, the same calciner can be used for drying and both calcination steps. Preferably the calciner is of a rotary design (as opposed to a static, porous tray design), and it is of a length and diameter so as to provide the desired counter-current flow of ammoniated vent gas and solids.

If the optional but preferable drying step is included in the process, then the ADM crystals and residual molybdenum solids are dried at a temperature of less than 250° C., preferably at a temperature of 100 to 200° C. The time necessary to dry the crystals and residual solids will vary with the temperature, amount of crystals, moisture level and configuration of the dryer/calciner, etc., but typically the crystals and residual solids will be dried to less than 1, preferably less than 0.1, wt % moisture content.

In one embodiment the ADM crystals and residual molybdenum solids are dried in a drier in which the crystals and solids are fed to the top and work their way down through a countercurrent flow of heated gas. The dried solids are removed from the bottom of the drier while the heated gas is emitted from or near the top of the drier. In this embodiment the drier has a stacked tray design.

Once the crystals and residual solids are dried, they are transferred to the first stage calciner and the temperature raised to between 300 and 450° C., preferably about 400° C., while a countercurrent of process gas is passed over and contacted with them. The calciner vent gas comprises steam and ammonia acquired from the ADM decomposition. Sufficient steam is added to dilute the ammonia in the off-gas to 25-30%. Superheated steam is introduced into the solids discharge end of the calciner, flowing counter-current over the solids and sweeping the ammonia out of the calciner. This allows substantial recovery of the ammonia, and thus avoids the emissions of ammonia and hydrogen (from the decomposition of ammonia) to the atmosphere, or of the incineration of these gases which, in turn, produces unwanted nitrous oxides. Steam is fully condensable and this means little, if any, effluent gas is produced. The amount of steam in the process gas is typically such as to match the requirements of the condenser used to capture and recycle the ammonia.

Moreover, the process gas sweeping over and in contact with the ADM crystals and the molybdic oxide product minimizes the contact of these materials with ammonia which, in turn, minimizes the conversion of molybdic oxide to molybdenum dioxide and reduces the conversion of ammonia to hydrogen. This, in turn, maximizes the percentage of the ammonia recovered from the decomposition of ADM to molybdic oxide.

The low operating temperature of the first stage calciner does not permit full calcination of the ADM. Additionally a percentage of the first stage calciner product is reduced to molybdenum dioxide. This means that calcination must be completed in a second stage calciner in which oxygen is present. The two stage calcination process therefore allows for complete calcination with almost quantitative ammonia recovery. This, in turn, results in a more efficient and environmentally friendly process.

Ammonia containing gases and solutions are subjected to a series of absorbers, strippers and scrubbers and recovered from the crystallizer and calciner off gases as ammonium hydroxide, and recycled back to the solvent extraction stage as aqueous ammonia. The other components of the off gases, e.g., minimal levels of hydrogen, nitrogen, oxygen from in-leakage, etc., are disposed in an environmentally acceptable manner. The use of the countercurrent steam flow in the dryer/calciner allows for the recovery of an ammonium hydroxide stream of sufficient strength, e.g., 25-30 weight percent (wt % $NH_3$), to allow for its quantitative recycle. Previous processes produced an ammonia gas stream of such diluted strength, e.g., 1-5 vol %, that recovery for recycle was not economic. Such streams comprised mostly water, nitrogen and hydrogen and were flared or otherwise disposed in an environmentally acceptable manner without the recovery of the ammonia values.

The molybdenum trioxide recovered from the second stage calcination is cooled and packaged for shipment. In one embodiment the product is shipped in pails, bags or drums as a powder. In one embodiment the crystals from the calciner are formed into briquettes using any suitable process, and the briquettes are then packaged for shipping. The molybdenum content of the product can vary but is typically no less than technical grade, and often of chemical grade.

Residual Molybdenum Recovery

The liquid purge from the crude or first stage ADM crystallizer, i.e., a mother liquor containing molybdenum, rhenium and selenium values and ammonium sulfate, is contacted with an acid, e.g., sulfuric acid at a pH near 2, preferably concentrated to avoid dilution of the rhenium circuit and increased loss of molybdenum, to cause the molybdenum values to precipitate. The precipitated moly oxides are then filtered from the slurry. The filter cake of precipitated molybdenum is dissolved and transferred back to the first stage crystallizer to capture these molybdenum values, and the molybdenum-depleted mother liquor, i.e., the filtrate, is forwarded to rhenium recovery.

Step G': Rhenium Recovery

Due to their occurrence as anions and similar properties, rhenium tracks closely with the molybdenum throughout the process. As such, the separation of rhenium from molybdenum can be difficult. To maximize this separation, a combination of factors is required. First, rhenium recovery is maximized if the ratio of rhenium to molybdenum is increased, for example, from a rhenium to molybdenum ratio of 1:300 in step D to a rhenium to molybdenum ratio of 1:3 after molybdenum precipitation.

Second, because the rhenium present in the molybdenite concentrate is substantially completely recovered in step E of the process (solvent extraction), it reports to the purified and loaded strip solution as ammonium perrhenate, $NH_4ReO_4$. If desired, this rhenium may be recovered from the molybdenum-depleted mother liquor by solvent extraction or, preferably, with an ion exchange resin (which can be used also to process not only the purified and loaded strip solution, but also the crystallizer mother liquor and/or the ammonium hydroxide recycle stream). The extractant or ion exchange resin possesses a high selectivity for rhenium over molybdenum. Quaternary amine extractants and ion exchange resins containing quaternary amine functional groups are commercially available such as that marketed under the trademark IRA 410. Weak base resins such as Purolite A172 are preferred because stripping can be accomplished with aqua ammonia. If rhenium is not recovered, it will be lost to effluent treatment. The removal of rhenium produces a rhenium-depleted effluent that serves as a feed for the selenium recovery stage.

Step G": Selenium Recovery

Selenium, like rhenium, tracks closely with molybdenum as molybdenum values move through the circuit and, as such, selenium is difficult to separate and remove from molybdenum. If rhenium is recovered with a weak base resin, then selenium is not recovered and it will pass out of the process as an effluent. However, because selenium in the aqueous form is environmentally regulated, the preference is to precipitate it and dispose of it in a controlled manner. The amount of selenium in the molybdenite at the start of the process is typically in the range of 50 to 100 parts per million (ppm) and appears in the rhenium effluent at levels approaching 100 ppm. By this stage in the process, selenium has been converted to its selenate (+6) oxidation state which is particularly difficult to remove.

In one embodiment of this invention, the liquid fraction remaining after rhenium is recovered as ammonium perrhenate, i.e., the rhenium-depleted mother liquor, is forwarded to a selenium recovery stage. A two-stage process is employed to firstly reduce and precipitate a majority portion of the selenium in the elemental form using iron powder at elevated temperature (e.g., 80-90° C.) and acid conditions (e.g., pH=2-2.5). In the second stage the pH is raised to 7-9 with NaOH, and with aeration the iron that dissolved in the first stage is oxidized and precipitates further adsorbing and removing selenium. The iron powder is typically of 100 mesh (Tyler) or finer, and the contacting is conducted at a temperature of 80-100° C., preferably 80-90° C., under a nitrogen purge (oxygen is deleterious to the precipitation with iron). The precipitation of selenium is conducted at a pH of 2-2.5 (less than 2 and acid consumes the iron, greater than 2.5 reduces selenium removal). If the treatment is spread over three steps, e.g., the use of three reactors in series to accommodate a three-hour retention time, then the first treatment will reduce the selenium content from about 100 ppm to 2-3 ppm, the second treatment to 1-2 ppm and the third treatment to less than 1 ppm. In one embodiment, the filtrate is removed of essentially all contents other than ammonium sulfate, the acid neutralized with NaOH to a pH of at or near 7-9 or higher, and then sent to the caustic boil for ammonia recovery.

After the selenium has been removed, the filtrate is forwarded to a caustic boil in which the filtrate is contacted with caustic (NaOH) releasing ammonia vapor from which aqueous ammonia is recovered. The caustic boil produces ammonia vapor and sodium sulfate solution. In earlier embodiments lime (CaO) and steam, or slaked lime ($Ca(OH)_2$), were used to recover ammonia from ammonium sulfate. The process was subject to considerable scaling of equipment due to the gypsum ($CaSO_4.2H_2O$) that it produces. Replacement of lime with caustic reduces, if not eliminates, these scaling problems. Aqueous ammonia is recovered at a relatively high concentration, e.g., 20-30 wt %, and recycled to the solvent extraction stage in which it is used to strip molybdenum values from the Mo-loaded organic phase. The residual solution containing largely sodium sulfate is sent to the effluent system.

In one embodiment a variant on the lime boil can be employed. In this embodiment, filtrate from the selenium removal stage is forwarded to a lime boil stage where it is contacted with slaked lime, filtered to remove solids and the filtrate forwarded for softening with sodium carbonate ($Na_2CO_3$). The softened product is filtered and the solids are combined with the filtered solids from the lime boil and disposed in an environmentally acceptable manner. The filtrate which is calcium free can then be thermally stripped to recover ammonia without fear of scaling the internals of the stripping equipment.

SPECIFIC EMBODIMENTS

Two-Stage Calcination Embodiment

Figure 1:
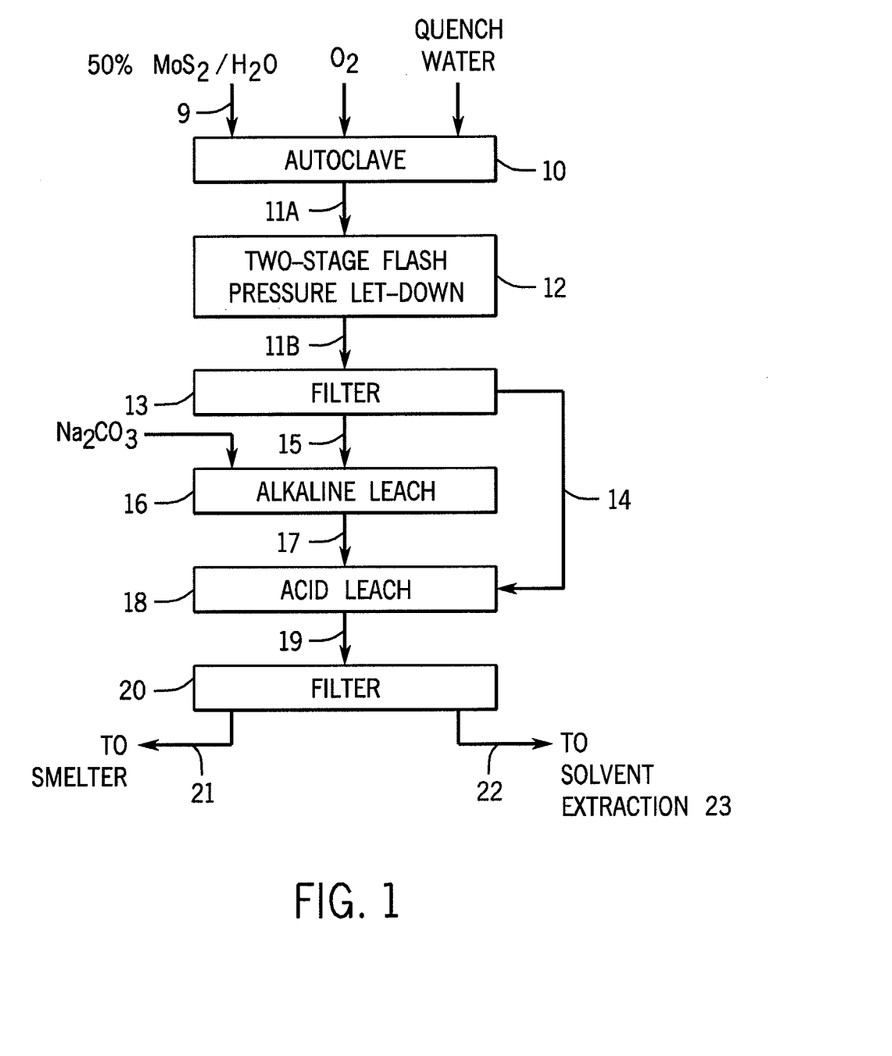
FIG. 1 is a schematic flow diagram describing certain embodiments of the pressure oxidation and alkaline and acid leaching steps of the process of this invention.

Referring to FIG. 1, molybdenite concentrate (particle size of 100 mesh U.S. Standard or less) comprising about 40% $MoS_2$ (or 24% Mo), copper, arsenic, phosphorus, rhenium and selenium values is mixed with water to about a 50 weight percent (wt %) concentration, and resulting slurry 9 fed to autoclave 10 which is equipped with agitators and baffles (neither shown). Autoclave 10 is maintained at about 215° C. and 400 psia (about 90 psia oxygen over-pressure). Steam (not shown) can be added to facilitate the start of the process but is otherwise not needed. Quench water is added as necessary to control the heat of reaction so as to maintain the desired temperature while a combination of oxygen addition and vent rate control the operating pressure. The molybdenite is maintained under constant agitation during the pressure oxidation process and after 1-5 hours of residence time, essentially all of the sulfide values within the concentrate are oxidized. The oxidation of the molybdenite generates sufficient sulfuric acid to maintain an acidic pH but if, for whatever reason, the environment within the autoclave is not as acidic as desired, then acid, e.g., sulfuric acid, can be added (not shown).

After substantial completion of the oxidation reaction, e.g., more than 99 percent of the sulfide values have been oxidized, pressurized and hot oxidation product 11A comprising a liquid fraction of dissolved molybdenum and a solid fraction of insoluble molybdic oxide, is transferred to two-stage flash pressure let-down 12 in which oxidation product 11A is depressurized to atmospheric pressure and then cooled to under 60° C. to form depressurized and cooled oxidation product 11B. The depressurized and cooled oxidation product 11B is then passed to filter 13 at which it is separated into filtrate 14 and filter cake 15.

Figure 2:
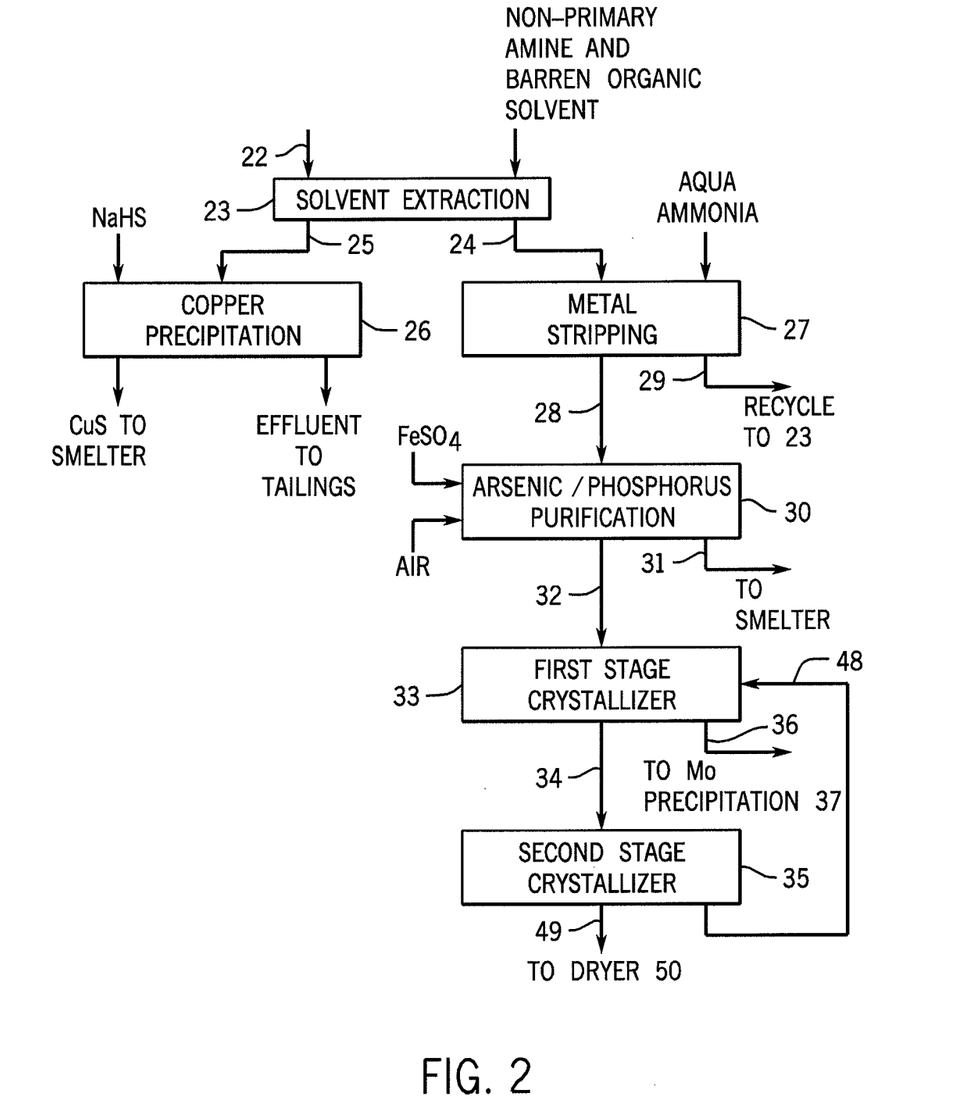
FIG. 2 is a schematic flow diagram describing certain embodiments of the solvent extraction, copper precipitation, arsenic/phosphorus purification and crystallization steps of the process of this invention.

Filter cake 15 is passed to alkaline leach 16 in which it is contacted with sodium carbonate at 20-30° C. and atmospheric pressure and a pH of 6.5 to 8 to render acid-soluble the insoluble molybdic oxide. Digested filter cake 17 is then combined with filtrate 14 at acid leach 18 in which the acid soluble molybdic oxide is solubilized under acidic conditions (e.g., 30+ grams/liter sulfuric acid). Acid leach slurry product 19 from acid leach 18 is passed to filter 20 at which it is separated into filter cake 21 and filtrate 22. Filter cake 21 retains many of the metal values, primarily precious metal values, contained in the molybdenite concentrate, and is forwarded for further processing to recover some of these metals, e.g., to a smelter. Filtrate 22 which contains the solubilized molybdenum values as well as the solubilized arsenic, phosphorus, copper, rhenium and selenium values, is passed to solvent extraction 23 (FIG. 2).

In solvent extraction 23, filtrate 22 is contacted at a temperature of 20-30° C. in a countercurrent manner with a nonprimary amine (e.g., ALAMINE 336) and barren organic solvent (e.g., AROMATIC 150). By "barren" is meant that the solvent is either virgin solvent, i.e., solvent that has not been previously used in solvent extraction 23, or recycled solvent 29 that has been stripped of essentially all values that it had previously gained from solvent extraction 23. Solubilized molybdenum, arsenic, phosphorus, rhenium and selenium values are extracted into the organic phase creating organic phase 24 which is rich in these values. Aqueous raffinate 25 retains the solubilized copper and iron values but is depleted in these other metal values. The two phases are separated from one another, and aqueous raffinate 25 is sent to copper precipitation 26 where it is contacted with sodium hydrosulfide (NaHS) which precipitates copper sulfide. The slurry containing the precipitated copper sulfide is typically thickened (not shown) and the underflow (precipitated copper sulfide) is sent to a smelter for further processing. The effluent, after treatment (e.g., contacted with lime (CaO or slaked lime ($Ca(OH)_2$) to precipitate the sulfate values as gypsum and the iron values as ferric hydroxide) is sent to an environmentally acceptable disposal site, e.g., a tailings pond.

Organic phase 24 is sent for countercurrent contact with aqua (i.e., aqueous) ammonia at metal-stripping 27. The aqua ammonia deprotonates the amine thus releasing the solubilized molybdenum, arsenic, phosphorus, rhenium and selenium values for collection into aqueous phase 28. Barren organic 29 (i.e., the stripped organic phase) is recycled back to solvent extraction 23. Make-up nonprimary amine and solvent are added as needed.

Figure 3:
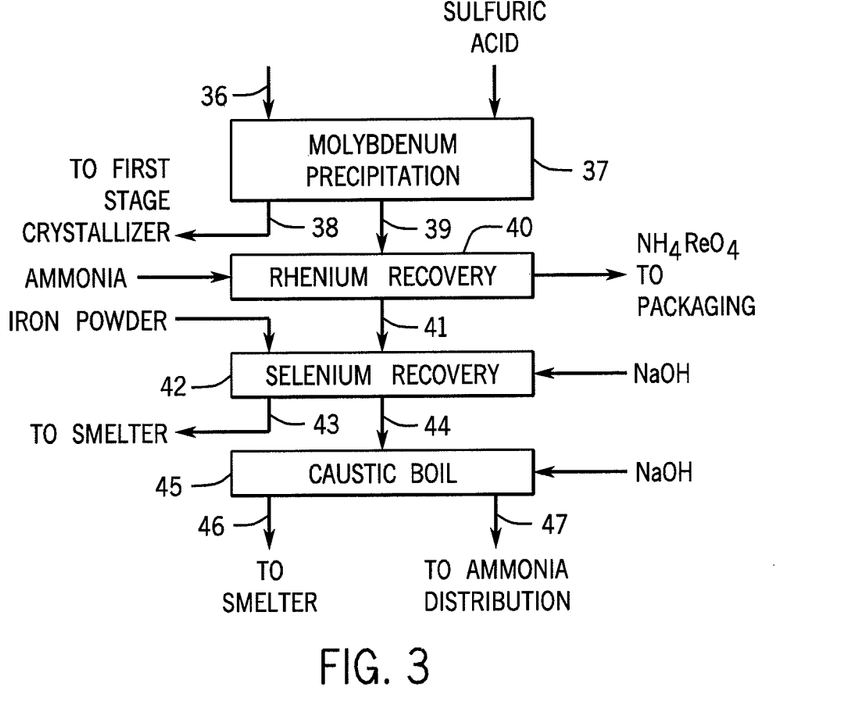
FIG. 3 is a schematic flow diagram describing certain embodiments of the molybdenum precipitation, rhenium recovery, selenium recovery and caustic boil steps of the process of this invention.

Aqueous phase 28 is sent to arsenic/phosphorus purification 30 in which it is contacted with ferrous sulfate ($FeSO_4$) and air to precipitate the arsenic and phosphorus values. The precipitated solids are collected as filter cake 31 and sent to a smelter for further processing. Filtrate 32 containing solubilized ammonium dimolybdate (ADM), rhenium and selenium values is sent to first stage evaporative crystallizer 33. Here the solubilized ADM is reduced to crude ADM crystals, i.e., ADM crystals associated with residual impurities. The crude ADM crystals are separated from their mother liquor by centrifugation (not shown) and the centrate (i.e., the mother liquor less the crude ADM crystals) is recycled (not shown) to first stage crystallizer 33. The crude ADM crystals are dissolved (not shown) in demineralized water (such as that produced by a reverse osmosis unit, not shown), filtered and the filtrate sent as solution 34 (which comprises solubilized ADM) to second stage growth crystallizer 35. The filter cake produced by the filtering of the dissolved crude ADM crystals is recycled (not shown) to arsenic/phosphorus purification 30. Purge stream 36 is drawn from first crystallizer 33 and sent to molybdenum precipitation 37 (FIG. 3). Purge stream 36 contains solubilized molybdenum, rhenium, selenium and sulfate values.

Referring to FIG. 3, purge stream 36 from first stage crystallizer 33 is passed to molybdenum precipitation 37 in which it is mixed with sulfuric acid to precipitate the solubilized molybdenum values. The precipitated molybdenum is collected by filtration (not shown), and filter cake 38 is recycled to first stage crystallizer 33. Filtrate 39 comprises solubilized rhenium, selenium and sulfate values, and these are passed to rhenium recovery 40 in which the filtrate is contacted with ammonia and micro-porous, weak-base ion exchange resin PUROLITE A172. This resin is highly selective for rhenium over selenium and molybdenum, and the rhenium values are collected and discharged for packaging as ammonium perrhenate ($NH_4ReO_4$).

Liquid fraction 41 from rhenium recovery 40 comprises solubilized selenium and sulfate values and is passed to selenium recovery 42. At this stage of the process the selenium is in its selenate (+6) oxidation state. This liquid fraction is contacted under acidic conditions (pH of 2-2.5) and at a temperature of about 90° C. with air and iron powder of 100 mesh (Tyler) or finer and containing as little contaminants as possible, e.g., less than 1,000, preferably less than 500, ppm of any one contaminant. Under these conditions the selenium precipitates with the iron and is recovered by thickening (not shown). Slurry 43 is sent to a smelter for further processing, and filtrate 44 is sent to caustic boil 45. Filtrate 44 is comprises mostly ammonium sulfate. It is treated with caustic to raise its pH to near or at 7, and then mixed with additional caustic in caustic boil 45 to convert ammonium sulfate to free ammonia. The ammonia in liquid fraction 47 is available for distribution within the process as needed. Stream 46 is forwarded to tailings through the smelter.

Figure 4:
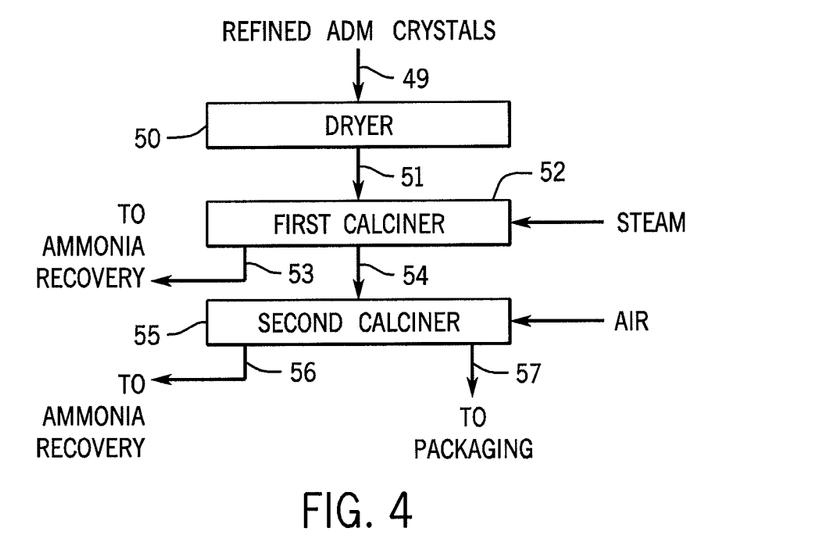
FIG. 4 is a schematic flow diagram describing certain embodiments of the drying and calcining steps of the process of this invention.

Referring to FIG. 4 and second stage crystallizer 35 in FIG. 3, the dissolved crude ADM crystals are precipitated as refined ADM crystals 49, i.e., ADM crystals with a much reduced level of impurities. Purge stream 48 containing residual impurities is withdrawn from second stage crystallizer 35 and recycled to first stage crystallizer 33 for further processing. Refined ADM crystals 49 are separated from their mother liquor by centrifuge (not shown) and the liquid fraction recycled to second stage crystallizer 35. Refined ADM crystals 49 are collected and sent to dryer 50 (FIG. 4).

Dryer 50 is a rotating hearth dryer and is operated at a temperature between 100 and 200° C. It receives refined ADM crystals 49 and dries the crystals to a moisture content of less than 0.1 percent. Dried crystals 51 are then transferred to first rotary calciner 52 in which they are contacted with a countercurrent sweep of steam to remove the ammonia produced by the decomposition of the ADM crystals to molybdic oxide. First calciner 52 is operated at a temperature of about 400° C. Steam enters the discharge end of calciner 52 and exits with the ammonia gas through the entry end of the calciner 52. This off-gas 53 (comprising 25-30 volume percent ammonia) is passed to an ammonia recovery stage (not shown) in which aqueous ammonia is recovered and recycled to solvent extraction 23.

Largely calcined ADM crystals 54 are passed to second rotary calciner 55 which is of the same design and operated in the same manner as first rotary calciner 52 except the calcining temperature is about 500° C. and air is the sweep gas rather than steam. Off-gas 56 which is very dilute in ammonia is sent to the ammonia scrubber (not shown) where it is contacted with sulfuric acid producing ammonium sulfate that is forwarded to caustic boil 45. The fully calcined ADM crystals are now molybdic oxide crystals 57 of chemical grade. These crystals are collected, mixed with any desired additives, e.g., a binder for briquetting, and packaged.

Tables 1-4 report a computer-modeled mass balance for a molybdenite concentrate containing 1,000 pounds per hour of molybdenum as described in FIGS. 1-4. Column headings correlate with the process streams of the figures. As is evident from this data, the process produces chemical grade molybdenum oxide (Column 57, 66.6+wt % Mo) and a quantitative recovery/removal of copper (Column 9 reports copper in solids enters the process at 176.97 lb/h and Column 25 reports that copper leaves the process, i.e., it deports to copper precipitation, at 176.54 lb/h); arsenic (Column 9 reports arsenic in solids enters the process at 2.337 lb/h and Column 31 reports that arsenic leaves the process, i.e., it deports to the smelter as a filter cake from arsenic/phosphorus precipitation, at 2.240 lb/h); phosphorus (Column 9 reports that phosphorus in solids enters the process at 2.499 lb/h and Column 31 reports that phosphorus leaves the process, i.e., deports to the smelter as a filter cake from arsenic/phosphorus precipitation, at 2.207 lb/h); rhenium (Column 9 reports that rhenium in solids enters the process at 0.333 lb/h and Column 36 reports that rhenium leaves the process, i.e., deports to molybdenum precipitation and then to rhenium recovery, at 0.306 lb/h (in filtrate 39 of FIG. 3, rhenium flow is 0.299 lb/hr which results in a 90% recovery of rhenium as $NH_4ReO_4$); and selenium (Column 9 reports that selenium in solids enters the process at 0.297 lb/h and Column 36 reports that selenium leaves the process, i.e., deports to molybdenum precipitation, followed by rhenium recovery and then selenium recovery (in slurry 43 selenium precipitate is at 0.247 lb/h for a selenium capture in excess of 80%).

TABLE 1

Computer-Modeled Mass Balance for the Processing of 1000 Pounds of Molybdenite Ore Per Hour (Flows 9-22)

| | IP Stream No. | | | | | | | | |
|---|---|---|---|---|---|---|---|---|---|
| | 9 | 11A | 11B | 15 | 17 | 19 | 21 | 14 | 22 |
| Mass Balance Stream No. | 117 | 204 | 213 | 214 | 215 | 217 | 227 | 229 | 301 |
| Solids Flow, stph | 2.086 | 1.314 | 1.308 | 1.307 | 0.949 | 0.953 | 0.952 | 0.001 | 0.000 |
| Aqueous Flow, stph | 2.086 | 13.142 | 18.305 | 0.436 | 2.416 | 21.657 | 0.408 | 19.384 | 22.790 |
| Organic Liquid Flow stph | | | | | | | | | |
| Gas Flow, stph | | | | | | | | | |
| Total Flow stph | 4.171 | 14.456 | 19.613 | 1.742 | 3.366 | 22.609 | 1.360 | 19.385 | 22.790 |
| Pulp Flowrate GPM | 10.748 | 57.101 | 69.736 | 3.754 | 9.008 | 80.175 | 3.049 | 72.011 | 82.770 |
| % Solids | 50.000 | 9.087 | 6.669 | 75.000 | 28.206 | 4.213 | 70.000 | 0.007 | 0.001 |
| Gas Flowrate, acfm | | | | | | | | | |
| Temperature, F. | 77.587 | 419.000 | 111.845 | 86.913 | 126.008 | 115.453 | 86.826 | 109.804 | 86.000 |
| Temperature, C. | 25.326 | 215.000 | 44.358 | 30.507 | 52.227 | 46.363 | 30.459 | 43.225 | 30.000 |
| Mo in Solids, lb/h | 1000.000 | 531.823 | 529.565 | 529.035 | 21.948 | 7.311 | 7.308 | 0.530 | 0.001 |

TABLE 1-continued

Computer-Modeled Mass Balance for the Processing
of 1000 Pounds of Molybdenite Ore Per Hour
(Flows 9-22)

| | IP Stream No. | | | | | | | | |
|---|---|---|---|---|---|---|---|---|---|
| | 9 | 11A | 11B | 15 | 17 | 19 | 21 | 14 | 22 |
| Mo in solids, wt % | 23.973 | 20.244 | 20.244 | 20.244 | 1.156 | 0.384 | 0.384 | 20.244 | 0.295 |
| Mo in Liquid, lb/h | | 468.177 | 468.178 | 0.000 | 507.088 | 990.435 | 0.000 | 468.178 | 990.420 |
| Mo in Liquid, gpl | | 16.975 | 13.806 | 0.000 | 133.249 | 25.115 | 0.000 | 12.985 | 23.897 |
| Re in Solids, lb/h | 0.333 | 0.027 | 0.027 | 0.027 | 0.027 | 0.027 | 0.027 | 0.000 | 0.000 |
| Re in solids, wt % | 0.008 | 0.001 | 0.001 | 0.001 | 0.001 | 0.001 | 0.001 | 0.001 | 0.001 |
| Re in Liquid, lb/h | | 0.307 | 0.307 | 0.000 | 0.000 | 0.307 | 0.000 | 0.307 | 0.307 |
| Re in Liquid, mgpl | | 11.120 | 9.044 | 0.000 | 0.000 | 7.777 | 0.000 | 8.506 | 7.400 |
| Cu in Solids, lb/h | 176.974 | 0.442 | 0.441 | 0.440 | 0.440 | 0.441 | 0.441 | 0.000 | 0.000 |
| Cu in solids, wt % | 4.243 | 0.017 | 0.017 | 0.017 | 0.023 | 0.023 | 0.023 | 0.017 | 0.018 |
| Cu in Liquid, lb/h | 0.012 | 176.544 | 176.545 | 0.000 | | 176.545 | 0.000 | 176.544 | 176.542 |
| Cu in Liquid, gpl | 0.003 | 6.401 | 5.206 | 0.000 | | 4.477 | 0.000 | 4.896 | 4.260 |
| As in Solids, lb/h | 2.337 | 0.315 | 0.313 | 0.313 | 0.313 | 0.006 | 0.006 | 0.000 | 0.000 |
| As in solids, wt % | 0.056 | 0.012 | 0.012 | 0.012 | 0.016 | 0.000 | 0.000 | 0.012 | 0.000 |
| As in Liquid, lb/h | | 2.022 | 2.022 | 0.000 | 0.000 | 2.330 | 0.000 | 2.022 | 2.330 |
| As in Liquid, mgpl | | 73.317 | 59.629 | 0.002 | 0.000 | 59.078 | 0.001 | 56.082 | 56.213 |
| Se in Solids, lb/h | 0.297 | | | | | | | | |
| Se in solids, wt % | 0.007 | | | | | | | | |
| Se in Liquid, lb/h | | 0.297 | 0.297 | 0.000 | 0.000 | 0.297 | 0.000 | 0.297 | 0.297 |
| Se in Liquid, mgpl | | 10.752 | 8.745 | 0.000 | 0.000 | 7.520 | 0.000 | 8.224 | 7.155 |
| P in Solids, lb/h | 2.499 | 0.002 | 0.002 | 0.002 | 0.002 | 0.002 | 0.002 | 0.000 | 0.000 |
| P in solids, wt % | 0.060 | 0.000 | 0.000 | 0.000 | 0.000 | 0.000 | 0.000 | 0.000 | 0.000 |
| P in Liquid, lb/h | | 2.497 | 2.497 | 0.000 | 0.000 | 2.497 | 0.000 | 2.497 | 2.497 |
| P in Liquid, mgpl | | 90.521 | 73.622 | 0.002 | 0.000 | 63.309 | 0.001 | 69.242 | 60.239 |
| NH4OH in Liquid, gpl | | | | | | | | | |
| NH3 in VAPOR, wt % | | | | | | | | | |

TABLE 2

Computer-Modeled Mass Balance for the Processing
of 1000 Pounds of Molybdenite Ore Per Hour
(Flows 29-31)

| | IP Stream No. | | | | |
|---|---|---|---|---|---|
| | 29 | 28 | 25 | 24 | 31 |
| Mass Balance Stream No. | 322 | 329 | 336 | 341 | 407 |
| Solids Flow, stph | | 0.016 | 0.000 | | 0.066 |
| Aqueous Flow, stph | 0.014 | 4.856 | 22.862 | 0.009 | 0.066 |
| Organic Liquid Flow stph | 28.346 | 0.000 | 0.001 | 29.224 | 0.000 |
| Gas Flow, stph | | | | | |
| Total Flow stph | 28.360 | 4.872 | 22.864 | 29.233 | 0.132 |
| Pulp Flowrate GPM | 127.934 | 15.807 | 86.332 | 132.227 | 0.352 |
| % Solids | | 0.320 | 0.001 | | 50.000 |
| Gas Flowrate, acfm | | | | | |
| Temperature, F. | 77.000 | 84.184 | 81.264 | 83.640 | 93.514 |
| Temperature, C. | 25.000 | 28.991 | 27.369 | 28.689 | 34.175 |
| Mo in Solids, lb/h | | | 0.001 | | 16.534 |
| Mo in solids, wt % | | | 0.295 | | 12.554 |
| Mo in Liquid, lb/h | 4.965 | 987.923 | 2.498 | 992.887 | 1.729 |
| Mo in Liquid, gpl | 0.077 | 125.000 | 0.058 | 14.996 | 13.450 |
| Re in Solids, lb/h | | | 0.000 | | |
| Re in solids, wt % | | | 0.001 | | |
| Re in Liquid, lb/h | 0.000 | 0.307 | 0.000 | 0.307 | 0.001 |
| Re in Liquid, mgpl | 0.000 | 38.800 | 0.001 | 4.632 | 4.134 |
| Cu in Solids, lb/h | | | 0.000 | | |
| Cu in solids, wt % | | | 0.018 | | |
| Cu in Liquid, lb/h | | 0.000 | 176.542 | 0.000 | |
| Cu in Liquid, gpl | | 0.000 | 4.084 | 0.000 | |
| As in Solids, lb/h | | | 0.000 | | 2.240 |
| As in solids, wt % | | | 0.000 | | 1.701 |
| As in Liquid, lb/h | 0.000 | 2.306 | 0.023 | 2.306 | 0.001 |
| As in Liquid, mgpl | 0.000 | 291.820 | 0.541 | 34.834 | 11.206 |
| Se in Solids, lb/h | | | | | 0.030 |
| Se in solids, wt % | | | | | 0.023 |
| Se in Liquid, lb/h | 0.000 | 0.278 | 0.019 | 0.278 | 0.000 |
| Se in Liquid, mgpl | 0.000 | 35.173 | 0.429 | 4.199 | 3.342 |
| P in Solids, lb/h | | | 0.000 | | 2.207 |
| P in solids, wt % | | | 0.000 | | 1.676 |
| P in Liquid, lb/h | 0.000 | 2.225 | 0.272 | 2.225 | 0.000 |
| P in Liquid, mgpl | 0.000 | 281.470 | 6.293 | 33.599 | 2.241 |
| NH4OH in Liquid, gpl | 0.021 | 19.605 | | | 1.845 |
| NH3 in VAPOR, wt % | | | | | |

TABLE 3

Computer-Modeled Mass Balance for the Processing
of 1000 Pounds of Molybdenite Ore Per Hour
(Flows 32-36)

| | IP Stream No. | | | | |
|---|---|---|---|---|---|
| | 32 | 34 | 49 | 48 | 36 |
| Mass Balance Stream No. | 415 | 423 | 429 | 431 | 514 |
| Solids Flow, stph | 0.000 | | 0.856 | 0.002 | 0.005 |

TABLE 3-continued

Computer-Modeled Mass Balance for the Processing of 1000 Pounds of Molybdenite Ore Per Hour (Flows 32-36)

| | IP Stream No. | | | | |
|---|---|---|---|---|---|
| | 32 | 34 | 49 | 48 | 36 |
| Aqueous Flow, stph | 5.618 | 3.491 | 0.045 | 0.483 | 1.159 |
| Organic Liquid Flow stph | 0.000 | 0.000 | 0.000 | 0.000 | 0.000 |
| Gas Flow, stph | | | | | |
| Total Flow stph | 5.618 | 3.491 | 0.901 | 0.485 | 1.164 |
| Pulp Flowrate GPM | 18.639 | 10.749 | 1.437 | 1.516 | 3.580 |
| % Solids | 0.000 | | 95.000 | 0.500 | 0.468 |
| Gas Flowrate, acfm | | | | | |
| Temperature, F. | 139.021 | 77.002 | 207.865 | 207.500 | 207.703 |
| Temperature, C. | 59.456 | 25.001 | 97.703 | 97.500 | 97.613 |
| Mo in Solids, lb/h | 0.003 | | 966.484 | 2.737 | 6.161 |
| Mo in solids, wt % | 12.554 | | 56.444 | 56.444 | 56.499 |
| Mo in Liquid, lb/h | 1088.997 | 1122.949 | 2.290 | 151.436 | 259.360 |
| Mo in Liquid, gpl | 116.681 | 208.633 | 25.517 | 200.000 | 145.000 |
| Re in Solids, lb/h | | | | | |
| Re in solids, wt % | | | | | |
| Re in Liquid, lb/h | 0.335 | 0.008 | 0.000 | 0.007 | 0.306 |
| Re in Liquid, mgpl | 35.864 | 1.403 | 1.254 | 9.825 | 171.089 |
| Cu in Solids, lb/h | | | | | |
| Cu in solids, wt % | | | | | |
| Cu in Liquid, lb/h | 0.000 | 0.000 | | 0.000 | 0.000 |
| Cu in Liquid, gpl | 0.000 | 0.000 | | 0.000 | 0.000 |
| As in Solids, lb/h | 0.000 | | 0.009 | 0.000 | 0.004 |
| As in solids, wt % | 1.701 | | 0.001 | 0.001 | 0.036 |
| As in Liquid, lb/h | 0.907 | 0.009 | 0.000 | 0.000 | 0.056 |
| As in Liquid, mgpl | 97.210 | 1.681 | 0.040 | 0.311 | 31.354 |
| Se in Solids, lb/h | 0.000 | | | | |
| Se in solids, wt % | 0.023 | | | | |
| Se in Liquid, lb/h | 0.271 | 0.006 | 0.000 | 0.006 | 0.247 |
| Se in Liquid, mgpl | 28.990 | 1.134 | 1.013 | 7.942 | 138.295 |
| P in Solids, lb/h | 0.000 | | 0.005 | 0.000 | 0.001 |
| P in solids, wt % | 1.676 | | 0.000 | 0.000 | 0.008 |
| P in Liquid, lb/h | 0.181 | 0.017 | 0.000 | 0.011 | 0.012 |
| P in Liquid, mgpl | 19.442 | 3.096 | 1.902 | 14.905 | 6.695 |
| NH4OH in Liquid, gpl | 16.010 | 1.237 | 38.386 | 2.549 | 5.701 |
| NH3 in VAPOR, wt % | | | | | |

TABLE 4

Computer-Modeled Mass Balance for the Processing of 1000 Pounds of Molybdenite Ore Per Hour (Flows 51-56)

| | IP Stream No. | | | | |
|---|---|---|---|---|---|
| | 51 | 57 | 53 | 54 | 56 |
| Mass Balance Stream No. | 552 | 559 | 561 | 571 | 815 |
| Solids Flow, stph | 0.858 | 0.605 | | 0.604 | |
| Aqueous Flow, stph | 0.000 | 0.000 | | 0.000 | |
| Organic Liquid Flow stph | 0.000 | 0.000 | | 0.000 | |
| Gas Flow, stph | | | 0.225 | | 0.058 |
| Total Flow stph | 0.858 | 0.606 | 0.225 | 0.604 | 0.058 |
| Pulp Flowrate GPM | 1.260 | 0.516 | | 0.517 | |
| % Solids | 99.989 | 99.987 | | 99.987 | |
| Gas Flowrate, acfm | | | 234.546 | | 35.700 |
| Temperature, F. | 249.800 | 140.000 | 192.200 | 752.000 | 140.000 |
| Temperature, C. | 121.000 | 60.000 | 89.000 | 400.000 | 60.000 |

TABLE 4-continued

Computer-Modeled Mass Balance for the Processing of 1000 Pounds of Molybdenite Ore Per Hour (Flows 51-56)

| | IP Stream No. | | | | |
|---|---|---|---|---|---|
| | 51 | 57 | 53 | 54 | 56 |
| Mo in Solids, lb/h | 968.774 | 807.081 | | 807.081 | |
| Mo in solids, wt % | 56.453 | 66.651 | | 66.827 | |
| Mo in Liquid, lb/h | | | | | |
| Mo in Liquid, gpl | | | | | |
| Re in Solids, lb/h | | | | | |
| Re in solids, wt % | | | | | |
| Re in Liquid, lb/h | 0.000 | 0.000 | | 0.000 | |
| Re in Liquid, mgpl | 889.067 | 930.474 | | 298.855 | |
| Cu in Solids, lb/h | | | | | |
| Cu in solids, wt % | | | | | |
| Cu in Liquid, lb/h | | | | | |
| Cu in Liquid, gpl | | | | | |
| As in Solids, lb/h | 0.009 | 0.007 | | 0.007 | |
| As in solids, wt % | 0.001 | 0.001 | | 0.001 | |
| As in Liquid, lb/h | 0.000 | 0.000 | | 0.000 | |
| As in Liquid, mgpl | 28.175 | 29.487 | | 9.471 | |
| Se in Solids, lb/h | | | | | |
| Se in solids, wt % | | | | | |
| Se in Liquid, lb/h | 0.000 | 0.000 | | 0.000 | |
| Se in Liquid, mgpl | 718.637 | 752.104 | | 241.565 | |
| P in Solids, lb/h | 0.005 | 0.004 | | 0.004 | |
| P in solids, wt % | 0.000 | 0.000 | | 0.000 | |
| P in Liquid, lb/h | 0.000 | 0.000 | | 0.000 | |
| P in Liquid, mgpl | 1348.750 | 1411.518 | | 453.360 | |
| NH4OH in Liquid, gpl | | | | | |
| NH3 in VAPOR, wt % | | | 30.000 | | 2.449 |

Filtration of Mo-Loaded Strip Suspension

Stripped organic and loaded strip aqueous produced in the bulk molybdenum solvent extractor are contacted typically at a 9:1 volume forwarding ratio of organic to aqueous. The aqueous-organic suspension is pumped through a vertical leaf-type filter, which is pre-coated with diatomaceous earth filter aid. Filtration is very rapid, and the phases undergo immediate separation upon exiting filtration (i.e., no suspension or emulsion is noted). This indicates that inter-stage filtration between mixer and settler does not hinder phase separation, indeed it is enhanced.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. A process for converting molybdenite to molybdenum oxide, the process comprising the steps of:
   A. Contacting under pressure oxygen and an aqueous suspension of molybdenite to form an acidic solution comprising dissolved molybdenum and a solid fraction comprising insoluble molybdic oxide;
   B. Separating the acidic solution comprising dissolved molybdenum from the solid fraction comprising the insoluble molybdic oxide;
   C. Converting at least a portion of the insoluble molybdic oxide of the solid fraction of step A to acid-soluble molybdic oxide;
   D. Combining the acidic solution comprising dissolved molybdenum of step A with the acid-soluble molybdic oxide of step C to dissolve the acid-soluble molybdic oxide;

E. Extracting the dissolved molybdenum of step D into an organic solvent comprising a nonprimary amine to produce a molybdenum-rich organic phase and a molybdenum-depleted aqueous raffinate;
F. Contacting the molybdenum-rich organic phase with aqueous ammonium hydroxide to recover an aqueous strip liquor comprising molybdenum as solubilized ammonium dimolybdate (ADM);
G. Crystallizing at least a portion of the solubilized ADM;
H. Calcining the crystallized ADM in a first calcination zone operated at 300-450° C. and with a countercurrent sweep of steam to produce a first calcined product and concentrated ammonia; and
I. Calcining the first calcined product in a second calcination zone operated at a temperature 450-600° C. under and in contact with an oxygen-containing atmosphere to produce a second calcined product comprising molybdenum oxide.

2. The process of claim 1 in which the aqueous strip liquor comprising molybdenum as solubilized ADM is contacted with ferrous sulfate at a pH of 8 or greater to produce precipitated arsenic and phosphorus and an arsenic- and phosphorus-depleted strip liquor containing solubilized ADM.

3. The process of claim 2 in which at least a portion of the solubilized ADM in step G is crystallized in two stages, the first stage using a first-stage ADM crystallizer to produce crude ADM crystals and a mother liquor purge stream containing dissolved molybdenum, rhenium, selenium and ammonium sulfate values, and the second stage using a second-stage ADM crystallizer to produce refined ADM crystals, the crude ADM crystals dissolved in water to form a feed for the second-stage ADM crystallizer, and the mother liquor purge stream from the first stage crystallizer contacted with an acid to produce precipitated molybdenum and a molybdenum-depleted mother liquor containing rhenium, selenium and ammonium sulfate values.

4. The process of claim 3 in which the first stage crystallizer is an evaporative crystallizer and the second stage crystallizer is a growth crystallizer.

5. The process of claim 4 in which the molybdenum-depleted mother liquor is contacted with a weak base ion exchange resin to remove rhenium values and to produce molybdenum-depleted and rhenium-depleted mother liquor containing selenium and ammonium sulfate values.

6. The process of claim 5 in which the molybdenum- and rhenium-depleted mother liquor is contacted with iron powder to produce precipitated selenium and a molybdenum-, rhenium- and selenium-depleted liquid phase containing ammonium sulfate.

7. The process of claim 6 in which the selenium is precipitated in two stages, the first stage comprising contacting the molybdenum- and rhenium-depleted mother liquor with iron powder at a temperature of 80-90° C. and a pH of 2-2.5, and the second stage comprising raising the pH to 7-9.

8. The process of claim 7 in which the pH of the second stage is raised by the addition of sodium hydroxide.

9. The process of claim 8 in which the molybdenum-, rhenium- and selenium-depleted liquid phase containing ammonium sulfate is contacted with caustic to produce ammonia vapor and sodium sulfate.

10. The process of claim 1 in which:
J. The aqueous suspension of a molybdenite concentrate further comprises molybdenum, arsenic, copper, iron and phosphorus, and forms an acidic solution comprising dissolved molybdenum, arsenic, copper, iron and phosphorus and a solid fraction comprising insoluble molybdic oxide;
K. Separating the acidic solution comprising dissolved molybdenum, arsenic, copper, iron and phosphorus from the solid fraction comprising the insoluble molybdic oxide;
L. Converting at least a portion of the insoluble molybdic oxide of the solid fraction of step J to acid-soluble molybdic oxide;
M. Combining the acidic solution comprising dissolved molybdenum, arsenic and phosphorus of step J with the acid-soluble molybdic oxide of step L to dissolve the acid-soluble molybdic oxide;
N. Extracting the dissolved molybdenum, arsenic and phosphorus of step M into an organic solvent comprising a nonprimary amine to produce an organic phase rich in molybdenum, arsenic and phosphorus and depleted in copper and iron, and an aqueous raffinate phase rich in copper and iron and depleted in molybdenum, arsenic and phosphorus;
O. Contacting the organic phase produced in step N with aqueous ammonium hydroxide to produce an aqueous strip liquor comprising molybdenum as solubilized ammonium dimolybdate (ADM), dissolved arsenic and phosphorus; and
P. Contacting under aeration conditions the aqueous strip liquor produced in step O with ferrous sulfate at a pH of 7 or greater to produce precipitated arsenic and phosphorus and an arsenic- and phosphorus-depleted strip liquor containing solubilized ADM.

11. The process of claim 10 in which the ferrous sulfate comprises less than 1,000 ppm of any contaminant.

12. The process of claim 10 in which the dissolved arsenic is separated from the solubilized ADM by feeding ferrous sulfate and the aqueous strip liquor comprising solubilized ammonium dimolybdate (ADM) and dissolved arsenic and phosphorus to a first tank to create a first tank overflow comprising precipitated arsenic and phosphorus and solubilized ADM, passing the first tank overflow to a second tank to which additional ferrous sulfate is added to create a second tank overflow comprising precipitated arsenic and phosphorus and solubilized ADM, and passing the second tank overflow to a third tank to create a discharge stream comprising precipitated arsenic and phosphorus and solubilized ADM from which precipitated arsenic and phosphorus are removed and solubilized ADM is passed to a crystallizer.

13. The process of claim 1 in which:
J. The aqueous suspension of molybdenite concentrate further comprises molybdenum and rhenium and forms an acidic solution comprising dissolved molybdenum and rhenium and a solid fraction comprising insoluble molybdic oxide;
K. Separating the acidic solution comprising dissolved molybdenum and rhenium from the solid fraction comprising the insoluble molybdic oxide;
L. Converting at least a portion of the insoluble molybdic oxide of the solid fraction of step J to acid-soluble molybdic oxide;
M. Combining the acidic solution comprising dissolved molybdenum and rhenium of step J with the acid-soluble molybdic oxide of step R to dissolve the acid-soluble molybdic oxide;
N. Extracting the dissolved molybdenum and rhenium of step M into an organic solvent comprising a nonprimary amine to produce an organic phase rich in molybdenum and rhenium and an aqueous raffinate depleted in molybdenum and rhenium;
O. Contacting the organic phase produced in step N with aqueous ammonium hydroxide to recover an aqueous strip liquor comprising molybdenum as solubilized ammonium dimolybdate (ADM) and rhenium;

P. Crystallizing at least a portion of the solubilized ADM in two stages, the first stage producing crude ADM crystals and a mother liquor purge stream containing dissolved molybdenum and rhenium values, the crude ADM crystals dissolved in water and filtered to form a feed for the second stage, and the second stage producing refined ADM crystals, and the mother liquor purge stream from the first stage contacted with an acid to produce precipitated molybdenum and a molybdenum-depleted mother liquor containing rhenium; and Q. Contacting the molybdenum-depleted mother liquor with a weak base ion exchange resin to recover rhenium values.

14. The process of claim 1 in which:

J. The aqueous suspension of molybdenite concentrate further comprises rhenium and selenium and forms an acidic solution comprising dissolved molybdenum, rhenium and selenium and a solid fraction comprising insoluble molybdic oxide;

K. Separating the acidic solution comprising dissolved molybdenum, rhenium and selenium from the solid fraction comprising the insoluble molybdic oxide;

L. Converting at least a portion of the insoluble molybdic oxide of the solid fraction of step J to acid-soluble molybdic oxide;

M. Combining the acidic solution comprising dissolved molybdenum, rhenium and selenium of step J with the acid-soluble molybdic oxide of step L to dissolve the acid-soluble molybdic oxide;

N. Extracting the dissolved molybdenum, rhenium and selenium of step N into an organic solvent comprising a nonprimary amine to produce an organic phase rich in molybdenum, rhenium and selenium and an aqueous raffinate depleted in molybdenum, rhenium and selenium;

O. Contacting the organic phase produced in step N with aqueous ammonium hydroxide to produce an aqueous strip liquor comprising molybdenum as solubilized ammonium dimolybdate (ADM), rhenium and selenium;

P. Crystallizing at least a portion of the solubilized ADM in two stages, the first stage producing crude ADM crystals and a mother liquor purge stream containing dissolved molybdenum, rhenium and selenium values, the crude ADM crystals dissolved in water and filtered to form a feed for the second stage, and the second stage producing refined ADM crystals, and the mother liquor purge stream from the first stage contacted with an acid to produce precipitated molybdenum and a molybdenum-depleted mother liquor containing rhenium and selenium;

Q. Contacting the molybdenum-depleted mother liquor with a weak base ion exchange resin to recover rhenium values and to produce molybdenum-depleted and rhenium-depleted mother liquor containing selenium; and R. Contacting the molybdenum- and rhenium-depleted mother liquor containing selenium with iron powder to produce precipitated selenium.

15. The process of claim 14 in which the selenium is precipitated in two stages, the first stage comprising contacting the molybdenum- and rhenium-depleted mother liquor with iron powder at a temperature of 80-90° C. and a pH of 2-2.5, and the second stage comprising raising the pH to 7-9.

16. The process of claim 1 in which refined ADM crystals are dried prior to calcination.

17. The process of claim 1 in which the molybdenite comprises one or both of greater than 5 weight percent copper or greater than 10 weight percent naturally floatable gangue.

18. The process of claim 1 in which the molybdenite comprises copper and the copper is oxidized and dissolved in step A, rejected into the aqueous raffinate of step E, and recovered from the aqueous raffinate of step E.

19. The process of claim 18 in which the copper is separated from the aqueous raffinate of step E by precipitation.

20. A two-stage process for the calcination of ammonium metal compounds, the process comprising the stages of:

A. Calcining the ammonium metal compound in a first calcination zone operated at 300-450° C. and with a countercurrent sweep of steam to form a first calcination zone product; and B. Calcining the first calcination zone product in a second calcination zone operated at a temperature 450-600° C. under and in contact with an oxygen-containing atmosphere to produce a metal oxide and ammonia.

* * * * *

UNITED STATES PATENT AND TRADEMARK OFFICE
CERTIFICATE OF CORRECTION

PATENT NO. : 8,753,591 B2  
APPLICATION NO. : 13/780312  
DATED : June 17, 2014  
INVENTOR(S) : Rockandel et al.

Page 1 of 1

It is certified that error appears in the above-identified patent and that said Letters Patent is hereby corrected as shown below:

In the Claims,

Claim 13
Column 24, line 59, replace "R" with --L--

Claim 14
Column 25, line 33, replace "N" with --M--

Signed and Sealed this
Twenty-sixth Day of August, 2014

Michelle K. Lee
*Deputy Director of the United States Patent and Trademark Office*